United States Patent

Aston et al.

[11] 4,340,344
[45] Jul. 20, 1982

[54] APPARATUS FOR MANUFACTURE OF THERMOPLASTICS PIPE

[75] Inventors: William C. Aston, Halesowen; Derek Walker, Wakefield, both of England

[73] Assignee: IMI Yorkshire Imperial Plastics Limited, Leeds, England

[21] Appl. No.: 185,926

[22] Filed: Sep. 10, 1980

[30] Foreign Application Priority Data

Sep. 15, 1979 [GB] United Kingdom ............ 7932064

[51] Int. Cl.³ ............................................. B29C 17/07
[52] U.S. Cl. ................................ 425/149; 264/535; 264/570; 264/573; 425/526; 425/387.1
[58] Field of Search ............... 264/506, 535, 570, 573; 425/526, 387.1, 149

[56] References Cited

U.S. PATENT DOCUMENTS 2,983,961  5/1961  Titterton et al. ............... 264/506
3,114,968 12/1963  Rudelick ...................... 156/287 X
3,175,246  3/1965  Loges et al. ................... 264/571 X
4,049,762  9/1977  Martino et al. ................. 264/531

FOREIGN PATENT DOCUMENTS 1432539  4/1976  United Kingdom .

Primary Examiner—Jan H. Silbaugh
Attorney, Agent, or Firm—Cushman, Darby & Cushman

[57] ABSTRACT

A mould for use in the manufacture of thermoplastics eg PVC pipe by radial expansion of a pipe blank, the mould comprising a cylindrical central portion 10 and two removable mould end portions 11, 12. The pipe blank 14 is located centrally within the mould by mandrels 13 within each mould end portion 11, 12. Water inlet/outlet ports 15, 16 are provided in each mould end portion 11, 12 to admit water to and remove it from the region between the blank 14 and the mould walls, and the mandrels 13 are hollow to permit inlet/outlet of water through the interior of the blank 14.

10 Claims, 3 Drawing Figures

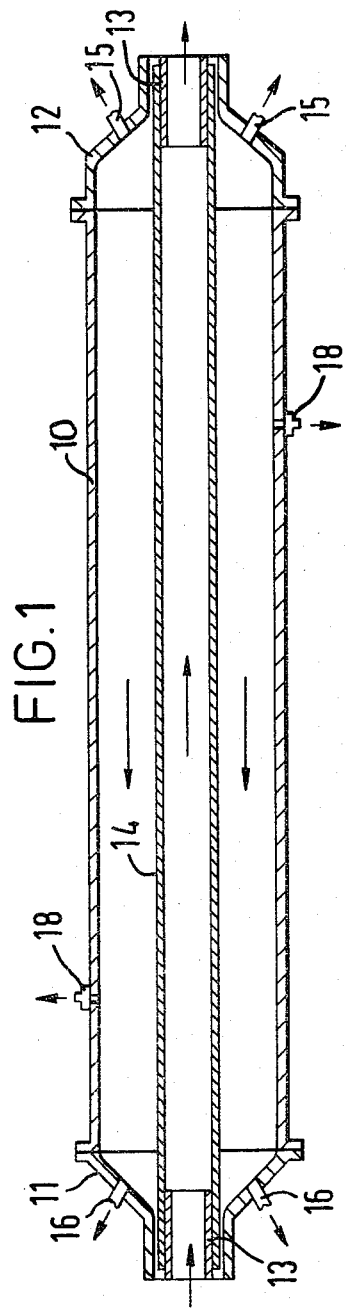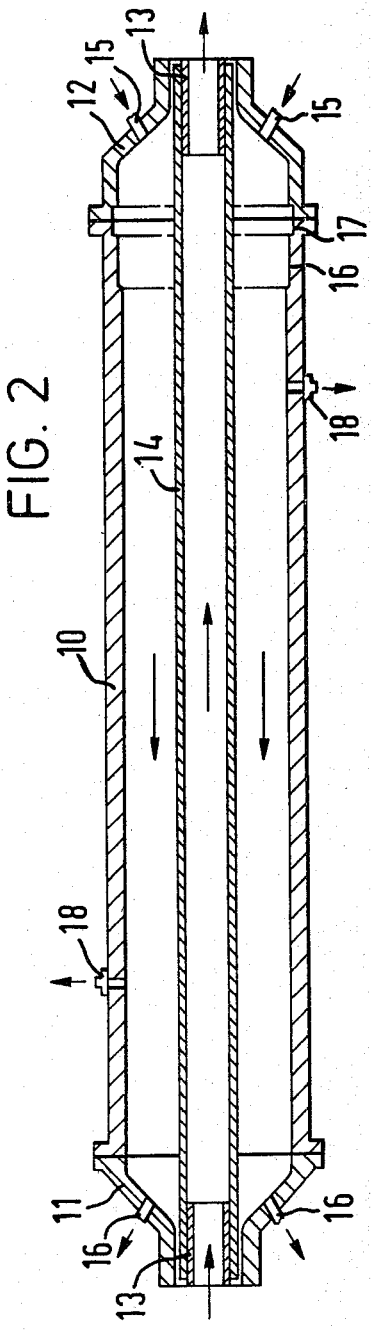

APPARATUS FOR MANUFACTURE OF THERMOPLASTICS PIPE

BACKGROUND OF THE INVENTION

This invention relates to the manufacture of thermoplastics pipe. It is particularly concerned with the manufacture of pipe by the radial expansion of a pipe blank by means of internal pressure.

Our British patent specification No. 1,432,539 discloses a method of forming at least part of a pipe of thermoplastics polymeric material within a female mould, by heating said part to a temperature at which deformation of the material induces orientation if the polymer molecules, and subsequently applying internal pressure to said part to force out said part of the pipe radially against the female mould. The pipe may include a socket portion of enlarged diameter, and the female mould may be designed to form this socket portion.

The present invention is concerned with improved apparatus for putting the previously described method into effect.

SUMMARY OF THE INVENTION

According to one aspect of the invention, apparatus for use in the manufacture of thermoplastic pipe by radial expansion of pipe blanks comprises a mould having a cylindrical central mould portion and two mould end portions closing the ends of the cylindrical central mould portion; means for centrally locating a pipe blank at its ends in each of the mould end portions, said locating means in use extending internally of the blank; means for admitting fluid through one mould end portion into the space which in use occurs between the blank and the cylindrical walls of the central mould portion and means for removing said fluid through the other mould end portion; means for admitting fluid through the locating means into the interior of the blank, and means for removing said fluid through the other locating means; and means for supplying fluid into the interior of the blank under such pressure as to cause the blank to expand radially into engagement with the interior of the mould.

One mould end portion may together with the central mould portion provide a socket-forming portion to the mould, such that the pipe formed in the mould has a socket at one end. The mould end portion providing the socket-forming portion is suitably removable for the admission and withdrawal of the blank and the formed pipe. The parts of the central mould portion and the mould end portion where they adjoin may provide for the moulding of a sealing groove ring for the internal formed pipe, said ring forming portion being of increased diameter from that of the remainder of the socket-forming portion.

The mould preferably forms part of a fluid circuit which incorporates means for supplying heated water to the space between the pipe blank and the interior of the mould, together with means for supplying heated water through the interior of the blank. The fluid circuit preferably includes means for supplying the interior of the blank with fluid at a substantially higher pressure than that used to heat the blank, to cause the heated blank to expand radially into contact with the walls of the mould. The heated fluid may be water at a temperature of about 90° C. During the heating of the blank, the fluid supply circuit may be arranged such that the water flow along the exterior of the blank travels in an opposite direction to the water passing through the interior of the blank. The flow of water on both the interior and exterior of the blank is controlled so as to ensure that turbulance is present.

The fluid circuit may incorporate a hot water generator for supplying heated water to the mould. The fluid circuit may also include a valve in the fluid path leading from the exit from the interior of the blank which can be closed during the period when water is pumped under higher pressure into the interior of the blank to expand the blank.

The mould may include pressure-releasing means, eg on the central mould portion, which permits water to leave the space between the blank and the mould when expansion of the blank causes the water in this space to exert a predetermined pressure on the pressure-releasing means.

BRIEF DESCRIPTION OF THE DRAWINGS

Embodiments of the invention will now be described, by way of example only, with reference to the accompanying drawings, in which:

FIG. 1 is a side elevation in cross-section of a mould for carrying out the invention, FIG. 2 is a side elevation in cross-section of a modified mould for carrying out the invention.

DESCRIPTION OF THE PREFERRED EMBODIMENTS

Figure 3:
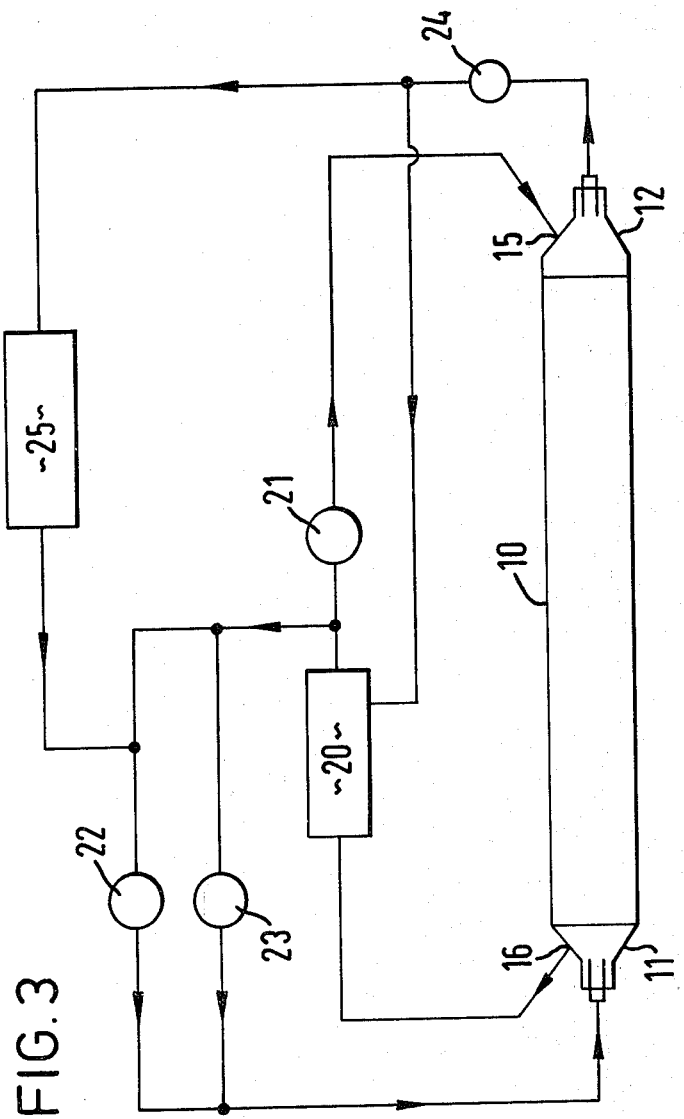
FIG. 3 is a schematic diagram of a fluid supply and pressurising system forming part of the invention.

The mould shown in FIG. 1 comprises a cylindrical central mould portion 10 with two mould end portions 11 and 12. Each mould end portion 11, 12 has a centrally located hollow mandrel 13 which in use extend internally of, and locates the ends of a thermoplastic PVC pipe blank 14 of cylindrical shape positioned in the mould.

Both end portions 11, 12 may in use be withdrawable from the central mould portion 10. Alternatively, only one end portion 12 is withdrawable in use from the central mould portion.

Water inlets 15 are provided in one mould end portion 12, such that water may be introduced into the space between the blank 14 and the cylindrical walls of the central mould portion 10. Water outlets 16 are provided in the mould end portion 11 at the other end of the central mould portion 10. The mandrels 13 are adapted to pass water through their hollow central portions into the interior of the blank 14.

The modified mould shown in FIG. 2 is substantially identical to FIG. 1 except in the details at one end of the mould. Like numerals are used to identify like parts.

Towards the end of the central mould portion 10 adjacent the end portion 12, the internal diameter of the central mould portion 10 increases in two stages. The first stage 16 increases to define the diameter of a socket end portion on the pipe to be formed, and the second stage 17 defines part of a groove ring on the pipe to be formed. The mould end portion 12 is also modified over that of FIG. 1 such that its internal diameter at the point where it meets the central mould portion 10 is increased to that of the internal diameter of the central mould portion 10, thereby defining the other part of the groove ring on the pipe to be formed. The remainder of the cylindrical interior of the mould end portion 12 has a diameter equal to that of the exterior of the end portion to be formed on the end of the pipe.

When the blank 14 has been assembled in the mould, as shown in FIGS. 1 and 2, the ends of the blank are sealedly clamped to the mandrels 13, and heated water, at about 90° C., is passed along the exterior of the blank 14 through inlets 15 and outlets 16, and also through the interior of blank 14, by means of the hollow mandrels 13. The flows of water along the exterior and the interior of the blank 14 are in opposite directions, and are at such a speed that the flow is turbulent, thereby improving the heat exchange characteristics between the water and the PVC blank 14. An arrangement for providing the hot water is shown schematically in FIG. 3.

Water from a hot water generator 20 is pumped by low pressure (eg 30 psi or 2 Atmospheres) pumps 21 and 22 along supply lines connected respectively with the space between the blank 14 and the interior of the mould, and with the interior of the blank 14. After a certain period when the PVC blank 14 has been thoroughly heated, the hot water supply to the exterior of blank 14 is stopped, and the hot water supply to the interior of blank 14 is switched by suitable valves to be pumped by a high pressure pump 23, at up to say 300 psi or 20 Atmospheres. At the same time a valve 24 in the line leaving the outlet from the interior of the blank 14 is operated to throttle the line, which results in the pressure in the line within the blank 14 gradually increasing as the high pressure pump 23 pumps against the closed valve 24.

The increased pressure results in the radial expansion of the pipe blank 14 until it meets the interior of the mould. Water trapped outside the blank but within the mould is released through pressure release valves 18 on the central mould portion as the pipe blank 14 expands. Following completion of the expansion of the blank 14 so that it conforms to the interior of the mould with the socket and groove ring optionally formed, the supply valves are suitably switched so that water at ambient temperature, say 25° C. is supplied from a cold water tank 25 to low pressure pump 22. At the same time the high pressure pump 23 is switched off and valve 24 opened, so that the cold water is pumped by pump 22 through the interior of the formed pipe, thereby cooling the pipe to a temperature where it is once more rigid.

After the formed pipe has been cooled, pump 22 is stopped and the mould end portions removed. The formed pipe can then be removed from the central mould portion 10, and the mould is then ready to receive the next blank for processing.

We claim:

1. Apparatus for use in the manufacture of thermoplastic pipe by radial expansion of a pipe blank, comprising a mould having a cylindrical central mould portion and two mould end portions closing the ends of the cylindrical central mould portion at least one of the end portions being removable from the central portion; means for centrally locating a pipe blank at its ends in each of the mould end portions, said locating means in use extending internally of the blank; means for supplying heated fluid through one mould end portion into the space which in use occurs between the blank and the cylindrical walls of the central mould portion and means for removing said fluid through the other mould end portion; means for supplying heated fluid at a first pressure through the locating means into the interior of the blank, and means for removing said fluid through the other locating means; and means for supplying fluid into the interior of the blank under such a higher pressure as to cause the blank to expand radially into engagement with the interior of the mould.

2. Apparatus according to claim 1 in which one end portion together with the central mould portion provides a socket-forming portion to the mould, such that the pipe formed in the mould has a socket at one end.

3. Apparatus according to claim 2 in which the mould end portion providing the socket-forming portion is removable from the central mould portion for the admission of the blank and the withdrawal of the formed pipe.

4. Apparatus according to claim 3 in which the parts of the central mould portion and the end portion where they adjoin, provide for the moulding of a sealing groove ring on the formed pipe, said ring moulding portion being of increased diameter from that of the remainder of the socket-forming portion.

5. Apparatus according to claim 1 wherein the mould forms part of a fluid circuit, said circuit incorporating means for supplying heated water to said means for supplying heated fluid through one mould end portion.

6. Apparatus according to claim 5 wherein said means for supplying the interior of the blank with fluid at said higher pressure than that used for heating the blank includes a high pressure pump.

7. Apparatus according to claim 5 or claim 6 wherein, during heating of the blank, the fluid supply circuit is arranged such that the fluid flow along the exterior of the blank is in a direction opposite to that of the fluid passing through the interior of the blank.

8. Apparatus according to claim 6 in which the fluid circuit includes a valve in the fluid path leading from the exit from the interior of the blank which can be closed during the period when fluid is pumped by said high pressure pump under higher pressure into the interior of the blank to expand the blank.

9. Apparatus according to claim 1 in which the mould includes pressure-releasing means which permits fluid to leave the space between the blank and the mould when expansion of the blank causes the fluid in this space to exert a predetermined pressure on the pressure-releasing means.

10. Apparatus for use in the manufacture of thermoplastic pipe by radial expansion of a pipe blank, comprising a mould having a cylindrical central mould portion and two mould end portions closing the ends of the cylindrical central mould portion, at least one of the end portions being removable from the central portion to permit movement of a pipe blank into and out of the central portion; a hollow mandrel axially insertable through each end portion and insertable into an end of a blank for centrally locating the latter; means for supplying heated fluid through one of the mould end portions into the space which in use occurs between the blank and the cylindrical walls of the central mould portion and means for removing said fluid through the other mould end portion; means for supplying heated fluid at a first pressure to one of the hollow mandrels so as to flow into the interior of the blank, and means for removing said fluid through the other hollow mandrel; and means for subsequently supplying heated fluid to one of the hollow mandrels at a higher pressure sufficiently high to cause the pipe blank to expand radially into engagement with the interior of the mould.

* * * * *